United States Patent
Bowe et al.

(10) Patent No.: US 9,925,753 B2
(45) Date of Patent: Mar. 27, 2018

(54) WEATHER-RESISTIVE BARRIERS FROM SELF COLLAPSING POLYURETHANE FOAMS

(71) Applicants: Rohm and Haas Company, Philadelphia, PA (US); Dow Global Technologies LLC, Midland, MI (US)

(72) Inventors: Michael D. Bowe, Doylestown, PA (US); Srdjan Kisin, Horgen (CH); Deborah A. Schutter, Minooka, IL (US); Janah C. Szewczyk, Philadelphia, PA (US)

(73) Assignees: Rohm and Haas Company, Collegeville, PA (US); Dow Global Technology LLC, Midland, MI (US)

( * ) Notice: Subject to any disclaimer, the term of this patent is extended or adjusted under 35 U.S.C. 154(b) by 171 days.

(21) Appl. No.: 14/552,854

(22) Filed: Nov. 25, 2014

(65) Prior Publication Data

US 2015/0144249 A1 May 28, 2015

Related U.S. Application Data

(60) Provisional application No. 61/909,108, filed on Nov. 26, 2013.

(51) Int. Cl.

| | | |
|---|---|---|
| *B32B 37/24* | (2006.01) | |
| *B29C 44/18* | (2006.01) | |
| *B29C 44/56* | (2006.01) | |
| *E04B 1/68* | (2006.01) | |
| *E04B 1/76* | (2006.01) | |
| *B29K 75/00* | (2006.01) | |
| *B29K 105/04* | (2006.01) | |

(52) U.S. Cl.
CPC .............. *B32B 37/24* (2013.01); *B29C 44/18* (2013.01); *B29C 44/5681* (2013.01); *E04B 1/68* (2013.01); *B29K 2075/00* (2013.01); *B29K 2105/04* (2013.01); *E04B 1/7604* (2013.01)

(58) Field of Classification Search
USPC .. 156/71, 77–79, 307.1, 307.3, 307.5, 331.7
See application file for complete search history.

(56) References Cited

U.S. PATENT DOCUMENTS

| | | | |
|---|---|---|---|
| 4,558,073 A | * | 12/1985 | Kluth .................... C08J 9/0061 521/110 |
| 5,183,830 A | | 2/1993 | Mohring et al. |
| 5,824,713 A | | 10/1998 | Schmitz et al. |
| 6,410,609 B1 | | 6/2002 | Taylor et al. |
| 6,894,083 B2 | | 5/2005 | Braun et al. |
| 7,662,221 B2 | | 2/2010 | Fay |
| 8,112,966 B2 | | 2/2012 | Bowe et al. |
| 8,151,538 B2 | | 4/2012 | Bowe et al. |
| 8,173,719 B2 | | 5/2012 | Moineau et al. |
| 2010/0175810 A1 | | 7/2010 | Korwin-Edson et al. |
| 2011/0072756 A1 | | 3/2011 | Collins |

FOREIGN PATENT DOCUMENTS

| | | |
|---|---|---|
| EP | 1533429 A1 | 5/2005 |
| WO | 2001061138 A1 | 8/2001 |
| WO | 2011123248 A1 | 10/2011 |
| WO | 2013072380 A2 | 5/2013 |
| WO | 2013102653 A1 | 7/2013 |

* cited by examiner

*Primary Examiner* — Sing P Chan

(57) ABSTRACT

The present invention provides a self-collapsing, moisture curable one component polyurethane foam (1K PU) composition from moisture curable polyurethane prepolymers and to methods of making weather resistant barriers and formed in place gaskets therefrom. The foam compositions are packed under pressure with a blowing agent. In the methods, the foams are applied to gaps in the exterior (sheathing) of a building under construction and collapse on cure to enable application an aqueous weather barrier coating thereover within an hour. The foams also cure when applied on or adjacent a structure to form a foam gasket that enables installation of additional structural elements over or adjacent the foam gasket without bowing or damage to the structure treated.

10 Claims, No Drawings

WEATHER-RESISTIVE BARRIERS FROM SELF COLLAPSING POLYURETHANE FOAMS

This invention relates to methods for making weather-resistive barriers and foamed in place gaskets for use in building and construction from self-collapsing, moisture curing one component polyurethane foams.

Buildings are commonly constructed with exterior wood, cement or gypsum-containing sheets or sheathing that are overlaid with decorative facades or cladding (e.g., wood, aluminum or vinyl sidings). When such a building is under construction, in many cases, a flexible sheeting material (e.g. Tyvek™, DuPont, Wilmington, Del., felt or tar paper) is nailed or stapled to the construction sheathing before the cladding is mounted. This sheeting material provides some protection against wind and liquid water penetration while the building is under construction and after the cladding is mounted. However, flexible sheeting is labor intensive to apply because the sheeting material must be unrolled and stretched over the area to be covered by hand, then nailed or stapled into place. Also, it is not a very good wind or water barrier because the sheeting material is placed in sheets side by side with some overlap of the sheets, and adjacent sheets are not typically sealed together. This allows for wind and water to enter between the overlaps. Wind and water can also enter behind the flexible sheeting through nail or staple holes.

More recently, liquid coatings on wood, cement or gypsum sheathing have been proposed, used with tapes on the joints between adjacent sheets of plywood to bridge the gaps between adjacent sheets. However, the tapes often require a separate coating that must be applied with a trowel or scraper that dries to form a hard sealant over the tape. This taping and coating process is quite labor intensive.

Latex or emulsion polymer foams have been also used as sealants and caulks around windows in houses under construction. Such known foams are dispensed from cans and expand upon application. Such foams are designed to fit in tight slots and not over joints with open space on one side. These foams tend not to adhere well to wood or gypsum sheathing, leaving joints unevenly covered. When such foams dry, however, they are difficult to compress such that they are not useful to seal joints, e.g. between sheathing sheets. Further, as the expanded foams do not compress when cladding is applied to sheets of wood or gypsum on the exterior of a building under construction, the cladding may buckle or ripple outwardly from the building.

Known one component polyurethane foams (1K PU) are applied into or over gaps in buildings, where they expand to fill the gap, then cure to block passage of air or water. One example is Great Stuff™ Window and Door sealant (The Dow Chemical Co., Midland, Mich.). Other PU foams are dispensed and undergo almost no further expansion, for example Great Stuff PRO™ Wall and Floor adhesive (Dow). However, because these 1K PU foams for construction applications expand or do not contract in use, they are unsuitable for building and construction applications that demand a sleek foam profile.

In U.S. Pat. No. 8,151,538, compressible foams from emulsion polymers were introduced to seal joints such as gaps between sheathing sheets. The emulsion polymer foams do compress in use to enable cladding or other coverings to be applied over them. However, the emulsion polymer foams dry too slowly to make them desirable for building contractor use; and they may be too tacky to handle for a time after application.

The present inventors have endeavored to solve the problem of providing a foam sealant for use in building construction applications which dries quickly and adheres strongly to a building substrate to form a weather barrier while at the same time being self-collapsing so they are easily compressed in use or retain a low profile after compression.

STATEMENT OF THE INVENTION

1. In accordance with the present invention, methods for making flexible, weather-resistive barriers for use in building and construction comprise applying self-collapsing, one component polyurethane foam compositions (1K PU foam) to a substrate chosen from a gap formed between adjacent sheets of wood, cement or gypsum exterior sheathing on a structural frame of a building under construction, including the margin of the sheathing adjacent the gap to hold the foam composition, and applying an aqueous polymeric coating, preferably, an acrylic emulsion polymer coating, having a density when dried of greater than 0.7 g/ml over the sheathing, wherein the one component polyurethane foam contains a) one or more blowing agents and b) one or more isocyanate prepolymers from the reaction of one or more polyisocyanate and one or more polyol in the presence of a catalyst, preferably, a wherein the isocyanate prepolymers have free isocyanate groups in the amount of from 2 to 10 wt. %, or, preferably, 9 wt. % or less and 4 wt. % or more, or, more preferably, 5 to 8 wt. %, based on total isocyanate prepolymer weight.

2. In accordance with the present invention, methods for making flexible, foamed in place gasket seals for use in building and construction comprise applying a foamed composition of one or more self-collapsing, one component polyurethane (1K PU foam) to a substrate chosen from a wood, steel, aluminum or composite structural element of a building under construction, allowing the foamed composition to dry to form a dry foam layer having a thickness equal to or less than the original thickness of the applied foam, installing an additional element chosen from a structural element or drywall adjacent the dry or cured foam layer on the wood, aluminum or composite structural element of a building under construction, wherein the one component polyurethane foam contains a) one or more blowing agents and b) one or more isocyanate prepolymers from the reaction of one or more polyisocyanate and one or more polyol in the presence of a catalyst, preferably, a wherein the isocyanate prepolymers have free isocyanate groups in the amount of from 2 to 10 wt. %, or, preferably, 9 wt. % or less and 4 wt. % or more, or, more preferably, 5 to 8 wt. %, based on total isocyanate prepolymer weight.

3. The methods as set forth in 2, above, wherein the structural element is a subfloor and the additional element is a tilt up wall.

4. The methods as set forth in 2, above, wherein the structural element is chosen from studs, sill plates, top plates, joists and the additional element is drywall.

5. The methods as set forth in any of 1 or 2, above, wherein the catalyst in the one component polyurethane foam compositions is an amine catalyst, preferably, a tertiary amine.

6. The methods as set forth in any of 1, 2 or 5, above, wherein the one component polyurethane foam compositions further comprise one or more surfactant chosen from a silicon containing surfactant and a nonionic surfactant.

7. The methods as set forth in any of 1, 2, 5 and 6, above, wherein the one component polyurethane foam compositions further comprise one or more diluent, flame retardant or plasticizer.

In another aspect, the present invention provides the one component polyurethane foam compositions as set forth in any of the methods of 1, 2, 5, 6, or 7, above.

As used herein, the term "aqueous" or "aqueous medium" refers to water or a mixture containing 50 wt. % or more, based on the total weight of the mixture, or water and one or more water miscible solvents, such as ethanol.

As used herein, the term "ASTM" refers to publications of ASTM International, West Conshohocken, Pa.

As used herein, the term "free isocyanate groups (% FI)" refers to the weight percent of free isocyanate in an isocyanate prepolymer as determined using the stoichiometric calculation:

$$\% \text{ FI} = 100 \times \text{Mw(NCO)} \times (\text{EqISO} - \text{EqPoly})/(\text{WISO} + \text{Wpoly}),$$

wherein EqISO is the equivalents of polyisocyanate used to make the isocyanate prepolymer, EqPoly is the equivalents of polyol used to make the isocyanate prepolymer, Mw(NCO) is the molecular weight of an isocyanate group (NCO) (42 grams per mole), WISO is the weight of the polyisocyanate and WPoly is the molecular weight of the polyol.

As used herein, the term "molecular weight" refers to the average molecular weight of a polyol or a surfactant as determined by the product of its functionality and its measured hydroxyl equivalent weight or MW=(f) (56.1×1000)/OH number, where f is the functionality of the material given by the manufacturer or as calculated from the stoichiometry of the initiators used to make the polyol (for example, a linear polyol has a functionality of 2); and where the OH number is measured by ASTM D4274D, titration Test Method D—Imidazole-Catalyzed Phthalic Anhydride Pressure Bottle (2011).

As used herein, the term "polyisocyanate" means any isocyanate group containing compound having two or more isocyanate groups, such as a diisocyanate, triisocyanate, oligomeric isocyanate or polymeric isocyanate.

As used herein, the term "polyol" means any hydroxyl group containing compound having two or more hydroxyl groups, such as a diol, a triol, oligomeric polyol, or polymeric polyol.

As used herein, the term "solids" refers to any non-volatiles or reactants and includes, for example, isocyanates, polyols, fillers, and any organic molecule that does not volatilize under storage or use conditions, e.g. non-volatile plasticizers.

Unless otherwise indicated, all temperature and pressure units are room temperature (22-23° C.) and standard pressure.

All phrases comprising parentheses denote either or both of the included parenthetical matter and its absence. For example, the phrase "(meth)acrylic acid" includes, in the alternative, acrylic acid and methacrylic acid.

The present invention provides methods of making weather-resistive barriers and gasket seals on a building under construction. The one component polyurethane foams of the present invention are moisture curable and dry to form a flexible and easily compressible dry layer having a thickness equal to or less than the thickness of the originally applied foam. Further, the one component polyurethane foams when dry are easily compressed and can accommodate structural enclosures built adjacent to them, even when the structure infringes on the foam boundary. For example, a 6 mm applied foam layer preferably shrinks upon cure to <2 mm and feels gasket-like, especially when the foam comprises a linear polyol and has 8 wt. % or less of free isocyanate groups, based on the total weight of the polyisocyanate prepolymer. Owing to its moisture curing, a foam band applied over 12 mm gap, cures to a skin which bridges the gap, thereby enabling weather barrier formation. Further, a foam band applied over loose 90° corner cures, and blocks water 25 mm deep, thereby enabling one to form in place a gasket sealant that can withstand additional infringement within its volume without compromising its sealant capability.

The one component polyurethane foam of the present invention can be used to make a liquid building wrap wherein a foam gap closure is made and then the exterior of the building structure is coated, as in U.S. Pat. No. 8,151,538 and U.S. Pat. No. 8,112,966, both to Bowe et al. And the one component polyurethane foams of the present invention can be used to make formed in place gaskets which can then be compressed as added structures are built thereon.

Methods of the present invention to make a weather-resistive barrier in a building employing adjacent sheets of wood, cement or gypsum exterior sheathing on a structural frame with gaps between the sheets comprise applying a one component polyurethane foam composition to the gaps wherein the when dispensed as a foam bead or strip 12 mm thick forms a flexible and easily compressible dry layer having a thickness equal to or less than the thickness of the originally applied foam, and applying an aqueous polymeric coating composition over the sheathing and the foamed composition, wherein the polymeric coating has a density when dried of greater than 0.7 g/ml. Preferably, the coating composition comprises an acrylic emulsion polymer.

The building can have an aluminum, steel, or wood structural frame to which exterior sheathing is attached or on which gasket seals are formed.

The coating compositions of the present invention can be applied by spray equipment, brush or roller.

In forming a weather-resistive barrier, the methods of the present invention may further comprise installing a decorative cladding over the coated sheathing.

In another aspect, the present invention provides methods of forming in place a gasket by applying the one component polyurethane foam composition of the present invention to a structural frame of a building, letting the foam cure or dry, and installing drywall or additional frame elements on the dry foam surface. The gasket could be formed onto a subfloor below the bottom plate of a tilt up wall, to seal against air infiltration when the wall is installed, thereby replacing sealant. Or the gasket could be formed on the face of studs, sill plates, top plates, joists and related framing before installation of drywall to reduce air movement as disclosed, for example, in US2010/0175810, to Korwin-Edson et al., at FIGS. 4A and 4B.

In accordance with the methods described above, the present invention provides one component polyurethane foams (1K PU foams) that dispense, may rise in forming a foam, then collapse in a controlled way to a thickness equal to or less than the thickness of the originally applied foam to form a lower profile foam or a surface skin comprising coarse or collapsed foam underneath. The foams can be applied as a sealant in many of the same methods and locations as currently available 1K PU foams, especially where air sealing is needed but insulation value is not needed. Since the foam product made from the compositions has a low profile and is flexible it may be less prone to damage by subsequent steps in the construction process.

In the one component polyurethane foam compositions of the present invention, a polyurethane prepolymer composition is provided comprising one or more polyisocyanate and one or more polyol composition wherein each polyol has a molecular weight of 500 to 12,000, and, further, wherein the ratio of the number of isocyanate equivalents to the number of polyol equivalents is from 1:0.99 to 1:0.7, or, preferably from 1:0.97 to 1:0.8. The polyol and isocyanate react in the one component polyurethane foam compositions; and the resulting polyurethane prepolymer that is part of the one component polyurethane foam compositions will have free isocyanate groups.

In making the one component polyurethane foams of the present invention, the polyol used to make the isocyanate prepolymer of the present invention and any added ingredients other than blowing agents are combined. This polyol mixture is added to the polyisocyanate used to make the isocyanate prepolymer of the present invention, and the composition is introduced into a container that is then sealed with a valve in place. The container is then charged with the blowing agent that dissolves into the mixture and acts to pressurize the container and form the cell structure of the moisture-cured foam. In the container, an excess amount of isocyanate of the stoichiometric ratio of isocyanate-to-polyol (NCO:OH) is reacted to form a polyurethane prepolymer with from 2% to 10% free NCO, and preferably from 4% to 8% free NCO. Once the reaction is complete (usually about 24 hours), a dispenser is then attached to a valve on the container. Upon activating the valve the composition is released from the container and delivered through the dispenser. The prepolymer reacts with atmospheric moisture to form a foam that quickly dries or cures on exposure to ambient moisture.

Suitable organic polyisocyanates are the aliphatic, cycloaliphatic, araliphatic and preferably aromatic polyisocyanates including, but not limited to alkylene diisocyanates having from 4 to 12 carbon atoms in the alkylene moiety, such as 1,12 dodecane diisocyanate, 2-methylpentamethylene 1,5-diisocyanate, tetramethylene 1,4-diisocyanate, hexamethylene 1,6-diisocyanate (HDI); cycloaliphatic diisocyanates such as cyclohexane 1,3- and 1,4-diisocyanate, 1-isocyanato-3,3,5-trimethyl 1-5-isocyanatomethylcyclohexane (isophorone diisocyanate), 2,4- and 2,6-hexahydrotoluene diisocyanate and the corresponding isomer mixtures 4,4'-, 2,2'- and 2,4'dicyclohexylmethane diisocyanate and the corresponding isomer mixtures, and preferably aromatic diisocyanates and polyisocyanates such as 2,4- and 2,6-toluene diisocyanate (MDI) and the corresponding isomer mixtures, 4,4'-, 2,4'- and 2,2'-diphenylmethane diisocyanates, polymethylene polyphenyl isocyanates, mixtures of 4,4'-, 2,4'- and 2,2'diphenylmethane diisocyanates and polymethylene polyphenyl isocyanates (PMDI), and mixtures of the PMDI and toluene isocyanates. Particularly preferred for inclusion with the triol and diol polyols mixture is polymethylene polyphenyl isocyanate. The MDI or another aromatic polyisocyanate is preferred.

The polyisocyanates may be modified as is conventional in the field of polyurethane foam chemistry. In one way of making a modified polyisocyanate, a polyisocyanate can be reacted with a polyol, a diol, a polyamine or a diamine, or their mixtures, in a stoichiometric ratio of isocyanate equivalents to the total equivalents of hydroxyl or amine groups in polyols and/or polyamines in the range of from 7:1 to 14:1 NCO to (OH and NH) equivalents, or, preferably, 9:1 to 12:1.

The polyisocyanate is present in the final isocyanate prepolymer composition of the present invention in an amount of from 20 to 50 wt. % of total polyol and polyisocyanate, or, preferably, from 30 to 45 wt. %.

The polyol composition in the isocyanate prepolymer of the present invention may be any of a polyglycol, a polyether and/or a polyester known for use in the production of polyurethane elastomeric adhesives and sealants, rigid, semi-rigid and froth foams. The polyether/polyester polyols may also contain amine groups. The molecular weight of the polyol may range from 500 to 12,000, or, preferably, from 750 to 10,000, or, more preferably, 1,000 or more.

Polyols may have a functionality of from 2 to 4, with small amounts (25 wt. % or less of all polyols, or, preferably, 10 wt./% or less, based on the total weight of polyurethane prepolymer solids) of polyols having 3 and 4 functional groups useful in improving foam strength. Suitable polyols may have an average functionality of from 2 to 2.5, preferably from 2.0 to 2.5, and, most preferably, 2.0. Average functionality is the weighted average of hydroxyl groups in a polyol mixture. Thus, if 80 grams of a difunctional polyol is mixed with 20 grams of a trifunctional polyol, the average functionality of the polyol mixture is (80(2)+20(3))/100(2) or 2.2.

Suitable polyols for use in making the isocyanate prepolymer of the present invention may be produced by techniques known in the art. For example, suitable polyesters are produced from polycarboxylic acids and polyfunctional alcohols having from 2 to 12 carbons atoms. Examples of polycarboxylic acids include glutaric acid, succinic acid, adipic acid, sebacic acid, phthalic acid, isophthalic acid or terephtalic acid. Examples of polyfunctional alcohols include ethylene glycol, propanediol, butane, and hexane diol. Polyether polyols can be obtained in conventional manners by reacting alkylene oxides, such as ethylene, propylene or butylene oxide, with an initiator having two active hydrogen atoms for a diol and with an initiator having three active hydrogen atoms for a triol. Examples of suitable initiators include ethylene glycol, diethylene glycol, propylene glycol, dipropylene glycol, tripropylene glycol, 1,4-butanediol, 1,6-hexane diol; cycloaliphatic diols such as 1,4-cyclohexane diol, glycerine, timethanoyl propane and triethanolamine.

Preferred polyols are those obtained using propylene oxide or a combination of propylene and ethylene oxide, such as, for example, poly(propylene oxide).

The mixture used to make the isocyanate prepolymer of the present invention further comprises a catalyst, such as an amine catalyst, to accelerate the reaction of the compounds in the mixture containing reactive hydrogen atoms and hydroxy groups. The preferred amine catalyst may comprise a primary, secondary or tertiary amine catalyst, with tertiary amine catalysts being particularly preferred. In addition to initiating the reaction between hydroxyl or active hydrogen and the isocyanate it is essential to accelerate the post moisture cure of the formulation to finished foam once the product is dispensed and used. Therefore many amine catalysts will be suitable, although tertiary amines are preferred including, but not limited to dimethylethanol amine (DMEA), tetramethyliminobispropyl amine (Dabco Polycat 15 Air Products, Allentown, Pa.), N,N-dimethylcyclohexyl amine (DMCHA), tetraethylenediamine (Dabco/TEDA Air Products, Allentown, Pa.), etc. Other suitable catalysts may include organometallic compounds such as tin mercaptide, dibuyltin dilaurate (DBTDL), etc.

Most preferably, the amine catalyst is a dimorpholine compound such as dimorpholinopolyethylene glycol, 2,2'- dimorpholinodiethylether (DMDEE), with 2,2'-dimorpholinodiethylether being particularly preferred. The dimorpholine catalysts are preferably present in the compound of the present invention.

The catalysts should be used in amounts low enough to allow the foam to remain self-collapsing in use and to prevent an unwanted exotherm from developing in any package in which the one component polyurethane foam compositions containing them are stored. Higher amounts are permissible in compositions having a lower free isocyanate group content and in areas where the ambient humidity is low. Overall, amounts range from 0.05 to 0.5 parts by weight, or, preferably 0.1 to 0.3 wt. %, based on the total weight of the one component polyurethane foam compositions.

Once the polyisocyanate and polyol blend are combined in a receptacle, such as a pressurizable container such as a metal aerosol can, the can is sealed with an aerosol valve prior to introducing one or more blowing agents. Useful blowing agents preferably include physical blowing agents.

The one component polyurethane foams are moisture curable. Preferably, when the one component polyurethane foam compositions of the present invention are applied in 80% relative humidity (RH), they cure sufficiently in <30 min to allow one to coat them with an aqueous polymeric coating. Even the lowest free NCO % content one component polyurethane foam will meet this standard if the RH is high enough.

Suitable physical blowing agents are preferably gases that are inert toward the organic, modified or unmodified polyisocyanates. Such blowing agents preferably have high vapor pressures and boiling points of 100° C. or less, and most preferably from 30° C. to 50° C. at atmospheric pressure, so that they evaporate after the foam is dispensed. Examples of suitable blowing agents include, for example, alkanes, such as heptane, hexane and n- and isopentane, preferably technical grade mixtures of n- and isopentanes and n- and iso butane and propane, cyclohexane, cyclopentane; ethers, such as furan, dimethyl ether and diethyl ether; ketones, such as acetone and methyl ethyl ketone; alkyl carboxylates, such as methyl formate, dimethyl oxalate and ethyl acetate; and halogenated hydrocarbons, such as methylene chloride, dichloromonofluoromethane, difluoromethane, chlorodifluoromethanes, difluoroethane, tetrafluoroethane, chlorofluoroethanes, 1,1-dichloro-2,2,2-trifluoromethane, 2,2-dichloro2-fluoroethane and hepafluoropropane, and mixtures thereof. Most preferably, the blowing agent may be an isobutane/propane/dimethyl ether mixture in combined amounts of from 11 to 16 parts by weight, and preferably about 13.2 parts by weight. The most preferred formulation is 67 to 70 parts by weight isobutane, 10 to 12 parts by weight propane, and 19 to 21 parts by weight dimethylether (DME).

The one component polyurethane foam compositions of the present invention may comprise the one or more blowing agent in a total amount of from 5 to 40 wt. %, or, preferably, from 10 to 35 wt. %, or, more preferably, from 15 to 28 wt. %, based on the total weight of the one component polyurethane foam composition.

The compositions may further comprise a cell opener to ease the collapse of the foam during curing. The cell opener is present at a concentration of greater than 0.01 wt. % or more, based on total polyol weight, or up to 0.1 wt. % or less, or, preferably 0.05 wt. % or less and 0.015 wt. % or more based on total polyol weight. Suitable cell openers include paraffin or silicon oils, silicone-free polymers containing polyvinyl alkyl ethers with a foam-inhibiting effect, such as, for example, BYK-051, -052 and -053 from BYK-Chemie GmbH, (BYK USA Wallingford, Conn.) or silicon-containing polymers like Tegostab™ B-8871, Tegostab™ B-8934, Tegostab™ 8935, (Evonik Industries AG, Essen, Germany) Niax L-6164 (Momentive Performance Materials, Inc., Columbus Ohio), Struksilon™ 8101 or 8002, available from resp. Schill+Seilacher "Struktol" GmbH, Hamburg, Germany, polydimethylsiloxane materials such as Baysilone™ Fluid M100 (Bayer Aktiengesellschaft, Leverkusen, Del.).

The composition may comprise one or more surfactants to stabilize the mixture. Such suitable surfactants may comprise silicon containing surfactants and nonionic surfactants, such as, for example, a butylene and ethylene oxide block copolymer surfactant, such as that sold as VORASURF™ 504 surfactant (The Dow Chemical Company, Midland, Mich.).

An example of a suitable useful surfactant is the reaction product of a poly(alkyl siloxane), preferably a poly(dimethyl siloxane) compound and a poly(alkylene oxide) copolymer, where the alkylene oxides are ethylene oxide, propylene oxide or butylene oxide. Such surfactants are well known in the art, see for example Surfactant Science Ser. 86 (Silicone Surfactants), 137-158 (1999). For use in the present invention, such suitable surfactants have a molecular weight of less than 30,000, less than 20,000 and, more preferably, 15,000 or less. To achieve a self-collapsing soft foam, such surfactants are used in the amount of 0.01 wt. % or more, based on the total weight of the one component polyurethane foam compositions.

Examples of commercially available surfactants suitable for use in the present invention include, those typically used in closed cell rigid foam applications such as DC 197, DC 193, B 8853, B 8462, B 8407, B 8404, L-5340, L-5420, L-6900; surfactants used for high resilience molded foam such as, DC 5164, DC 5169, B 8638, B 8681; and surfactants used for high resilience slab foam such as DC 5043, B 8707, and B 6881. The DC series of surfactants is available from Air Products Inc., Allentown, Pa.; the B series is available from Evonik Industries AG, (Essen, Germany) and the L-series is available from Momentive Performance Materials, Inc., (Columbus Ohio). Most preferred are the commercially available rigid type silicone surfactants. Most preferred are surfactants such as L-5340, L-5420, DC-197 and DC-193. The surfactants are present in the composition of the present invention in an amount of from 0.5 to 4.0 wt. %, preferably 1 to 3 wt. %, based on the total weight of the one component polyurethane foam composition.

The one component polyurethane foam compositions of the present invention may comprise one or more diluent, plasticizer and/or flame retardant in a total amount of from 0.5 to 30.0 wt. %, or, preferably, from 1.0 to 20 wt. %, or, more preferably, from 4.0 to 17 wt. %, based on the total weight of the compositions.

Preferably, the amount of flame retardant ranges from 4 to 15 wt. %, based on the total weight of the one component polyurethane foam compositions.

Suitable plasticizers or diluents may comprise phosphates or chloroparaffins, which often exhibit at the same time also flame retardant properties, but may also be esters, preferably, diesters, such as adipates, phthalates, cyclohexanoates, preferably those of alcohols having at least 4 and preferably at least 7 carbon numbers, such as of isononyl alcohol. Suitable examples of phosphates are triethyl phosphate (TEP), trichloropropyl phosphate (TCCP), and tripotassium phosphate (TKP). Suitable chlorinated paraffins are readily obtainable, such as Cerecior™ S42 and others from INEOS ChlorVinyls Americas Inc. (Wilmington, Del.). Also mixtures of these compounds may be used. Plasticizers such as the diesters mentioned, e.g. diisononyl adipate, may be obtained from suppliers including BASF (Ludwigshafen, Del.), Evonik Industries AG, (Essen, Germany) or Exxon-Mobil Chemical (Fairfax, Va.). Triethyl phosphate (TEP) may be obtained from Lanxess company (Leverkusen, Del.). Also higher molecular weight monoesters may be used, such as isononylbenzoate (INB) obtainable from Evonik. Another suitable compound may be 2,2,4-trimethyl-1,3-pentanediol diisobutyrate (Texanol™) obtainable from Eastman Chemicals (Kingsport, Tenn.).

Suitable flame retardants may be selected from any compound with flame suppression properties and which may be dissolved or dispersed in the one component polyurethane foam. Examples include halogenated, in particularly brominated, ethers from the type "Ixol" from the company Solvay S.A., Brussels, Belgium, 3,4,5,6-tetrabromo-, 2-(2-hydroxyethoxy)ethyl-2-hydroxypropyl ester), organic phosphates and phosphonates, in particular diethyl-ethane phosphonate, triethyl phosphate (TEP), triphenyl phosphate, tetrabromo phthalate ester (available as DP45, Great Lakes Solutions, West Lafayette, Ind.), dimethyl propyl phosphonate, diphenyl cresyl phosphate, as well as chlorinated phosphates, such as chlorinated or brominated phosphates, in particular tris-(2-chloroethyl)phosphate, tris-(2-chloroisopropyl)phosphate (TCPP), tris(1,3-dichloroisopropyl)-phosphate, tris-(2,3-dibromopropyl)phosphate, pentabromo diphenyl oxide and tetrakis-(2-chloroethyl)-ethylene diphosphate; and mixtures thereof.

Preferably, the flame retardant is a soluble liquid which does not have free hydroxyl groups, so as not to affect the amount of NCO functions present, such as triethyl phosphonate, pentabromodiphenyl oxide, and most preferably is tri(1-methyl-2-chloroethyl)phosphate or TCPP.

The one component polyurethane foam compositions may be formulated such that the foamed product may be made to cure to any useful color or shade as would be readily apparent to one skilled in the field of polyurethane foam formulations. For example, to create foam with color, colorants may be used.

Additional reactive components can be added to the one component polyurethane foam compositions such as silyl-terminated substances, which are compatible yet do not react in the can with the isocyanate prepolymer. These, however, will also moisture cure independently once dispensed from the container.

The one component polyurethane foams of the present invention exhibit foaming forces that remain relatively constant regardless of how they are dispensed; that is with or without straw tip extenders. The one component polyurethane foam compositions may be dispensed via any useful dispensing system, preferably, under pressure, such as, for example in a valved aerosol can. More preferably, the valved aerosol can has a dispenser attached to the can for dispensing the polyurethane composition into a foamed state. According to the present invention, a preferred dispenser is any as disclosed in U.S. Pat. Nos. 6,032,830; 5,887,756; 5,615,804 and 5,549,228.

In accordance with the present invention, the dispenser for the one component polyurethane foam compositions is adapted with an extender, preferably, an elongated cylindrical, strawlike attachment temporarily or permanently affixed to the end of the dispenser. The straw may be any useful length, preferably from 8 to 25 cm (3 to 10 inches) long.

The polymer in the coating composition for making the weather-resistive barriers of the present invention may comprise an aqueous emulsion polymer with a Tg less than 25° C. or a blend of more than one such polymer.

If desired, faster setting or skinning to prevent recently applied but incompletely dried applied coatings from being washed off by a sudden rainstorm can be achieved by including in the formulation a polyfunctional amine as disclosed in U.S. Pat. No. 5,804,627 (Rohm and Haas) or a polyethyleneimine as disclosed U.S. Pat. No. 6,376,574 (Dow).

The coating composition (b) should be selected so as to allow for an appropriate water vapor transmission from the building to reduce any moisture condensation in the walls of the building. The vapor transmission rate is most often measured according to ASTM E-96 (1996) and expressed in units of perms, where higher perms correlate with a greater rate of water vapor transmission. OSB, a common sheathing material, has approx. 3-6 perms. For a home, in which interior moisture from cooking and bathing is generated, a weather resistive barrier (b) with >10 perms may be desired. By contrast, for commercial buildings with higher capacity HVACs that remove sufficient moisture from the interior so that water does not condense in the walls, a low perm weather resistive barrier may be preferred. One skilled in the art of coating formulation can make coatings with a desired perm value, measuring candidate coating compositions (b) according to ASTM E-96. Further, commercially available coatings are sometimes provided with a perm data, which can aid in the selection of a coating properly matched to the building science teachings.

The ingredients in the coating compositions of the present invention may include biocides, rheology modifiers, extenders (fillers), opacifying pigments (mineral and organic (e.g. opaque polymer)), fly ash, dispersants, defoamers, UV stabilizers, colorants, fire retardants, pH adjusters or buffers, coalescents, cosolvents, glass fibers, carbon fibers, microbeads and anti-freeze agents.

EXAMPLES

The following examples serve to better illustrate the invention, which is not intended to be limited by the examples.

The one component polyurethane foams of the present invention were formed by combining the polyols indicated in Table 2, below. The polyol blends were then formulated into 3 prepolymers by combining polyol blend and pMDI in an aerosol can and sealing the valve on. If the can is intended to make a straw foam a small amount of cell opener, i.e. silicone fluid, was also included; for gun foams this was omitted. Finally, the cans of prepolymer were charged with the blowing agent gas blends. The formula of each can is summarized in Table 3, below, which includes the % free isocyanate (% FI or % Free NCO), calculated by the equation:

$$\% \text{ FI} = (100 \times \text{Mw(NCO)} \times (\text{EqISO} - \text{Eqpoly}))/(\text{WISO} + \text{Wpoly})$$

wherein EqISO is the equivalents of isocyanate, Eqpoly is the equivalents of polyol, Mw(NCO) is the molecular weight of isocyanate (NCO) groups (42 grams per mole), WISO is the weight of isocyanate and Wpoly is the weight of polyol.

Gun cans were screwed onto a GREAT STUFF™ PRO gun (Dow), and foam dispensed by pulling the trigger. Straw cans had a straw attached directly to the valve, and this valve was deflected to dispense foam through the straw. In all cases, foam was dispensed into a 120 cc paper cup until level, then weighed, to calculate the fresh foam density in g/cc.

The following test methods were used to evaluate the foams of the present invention:

Fresh foam density: Foam density was measured by dispensing foam into a tared 120 cc paper cup until just level with the rim of the cup, and then weighing. The foam density was calculated as Grams of foam/120 cc cup volume=density (units of g/cc)

Acceptable foam density is 0.02 to 0.15 g/cc, preferably from 0.02 to 0.10 g/cc, or, more preferably, from 0.02 to 0.08/cc.

Foam Cure speed: An approximately 2.5 m×3.5 m environmental room was equilibrated to 27° C. and 80% relative humidity. Plywood boards of 150×150 mm were kept in the room overnight. Foam was applied through a PRO gun or straw in touching, parallel beads to make bands of 50 mm width. Specimens of both 12 mm and 6 mm approximate thickness were prepared, with fresh foam thickness measured by inserting a 1 mm diameter stick into the foam in several locations to probe its fresh thickness. After some hold time, an aqueous coating composition was sprayed onto the 6 mm thick bands of foam with a Graco ProShot™ cordless airless sprayer (Graco Inc., Minneapolis, Minn.), which operates at up to 137 bar of pressure The coating was sprayed from 300 mm away in 5-6 passes to a wet coating thickness of 0.6 to 0.75 mm over the plywood boards standing vertically. Specimens were examined for immediate damage or mixing of the foam and coating layers. Foam was deemed to have cured in the hold time if the coating formed a continuous layer over the board and foam, without visually damaging the foam. An acceptable foam cure speed is less than 2 hours at 4° C. to 40° C. and at 20% relative humidity (RH) to 90% RH. The cure speed is, preferably, 1 hour or less.

Degree and Rate of Foam Shrinkage Upon Cure:

A plywood board was laid flat with a ruler vertically aligned approx. 50 mm back from the edge. A camera was laid on the bench 300 mm away from the plywood board. A bead of the tested one component polyurethane foam composition was gunned along the board about 25 mm back of the front edge, and photos were periodically taken. Zoom images allowed measurement of the bead height as a function of time. An acceptable degree of shrinkage is at least 25% (e.g. 12 mm thick fresh foam shrinks to ≤9 mm thickness); a preferred shrinkage is 50% or more (e.g. 12 mm shrinks to ≤6 mm); and a more preferred shrinkage is at least 67% shrinkage (e.g. 12 mm goes to ≤4 mm). An acceptable rate of shrinkage is ≤3 hours, preferably ≤1 hour, to reach the final foam thickness.

Weather Resistive Barrier (WRB) Function: A specimen was made by attaching two 150×75 mm rectangles of Oriented Strand Board (OSB) to a wooden frame, to define a gap 150 mm long and 3 mm wide between the edges of the two OSB boards. The tested one component polyurethane foam composition was applied over the gap in a band 50 mm wide and 6 mm thick. After some cure time, an aqueous coating was applied by spraying as above in the "cure speed of foam" test. After allowing the aqueous coating to dry for 7 days, a cylinder of 100 mm diameter and 600 mm height was fixed with silicone sealant to the aqueous coated surface such that the treated gap in the OSB spanned the diameter of the cylinder. This cylinder was filled to 550 mm deep with water, and the back of the specimen was periodically inspected for leaks for 24 hours.

Foam Compressibility: Compressibility is measured by applying the indicated load to a cured one component polyurethane foam composition. An acceptable cured foam compresses to ≤25% its fresh applied thickness when 0.035 MPa pressure is applied (e.g. a 12 mm of fresh foam can be compressed after cure to ≤3 mm thick when 0.035 MPa pressure is applied). Preferably, the cured foam compresses to ≤15% of its freshly applied thickness under 0.035 MPa pressure.

Foam Compressibility Test (method adapted from U.S. Pat. No. 8,151,538): One component polyurethane foam composition bands about 50 mm wide and 12 mm in initial thickness were applied on plywood and cured for 7 days. A stiff aluminum plate 75 mm long×25 mm wide×3.3 mm thick was laid across the dried foam band as closely as possible to parallel to the plywood surface, to span the width of the band completely and have a contact area between the plate and foam of 25 mm×50 mm. Weights were placed onto the plate to give a total weight of 225 g, creating a pressure of about 0.0035 MPa, and the height of the foam under the plate was measured after 1 minute. To measure compressed height of the foam, a feeler gauge was slipped under each protruding edge of the aluminum plate, and the average of two sides recorded. Weight was increased to 2.2 kg creating a pressure of about 0.035 MPa. The height of the foam was measured after 1 minute Gasket function: The air barrier function of a cured one component polyurethane foam gasket having a thickness of 6 mm was measured as described immediately below under application of a 25 Pa air pressure differential between the two sides of the foam gasket. Acceptable results are any in which the air flow is reduced to ≤50% what it is with no gasket, preferably, ≤25%, or, more preferably ≤10%.

Formed in Place Gasket Test: A 112×112×1.27 cm frame was constructed from a single sheet of plywood. A 48.3× 48.3 cm square was cut though the center of the frame. A stud square of nominal 2×4" studs (actual board cross section=3.8×8.9 cm) was constructed to have external dimension of 48.2 cm, and internal dimension of 40.6 cm. This stud square was mounted through the square hole in the plywood frame to protrude at least 3 cm above the plane of each face of the plywood frame, leaving a square, raised rim above each face of the test specimen, the exposed faces of the rim being formed from the 3.8 cm side of the studs. The exterior sides of the stud square were sealed to the plywood frame with silicone sealant. Two pieces of 1.27 cm plywood were mounted with screws onto the back raised rim, leaving a 0.3 cm gap between them. The result was a 40.6×40.6×8.9 cm cavity backed with the two pieces of plywood. The assembly was laid flat with the cavity facing upward, and eight 0.75 mm paperclips were laid on the 3.8 cm faces of the front raised rim of the stud square, 2 paperclips per side of the square. The paperclips would cause an air leakage gap to form between the stud face and drywall to be installed later. Foam was applied in a continuous band 10 to 20 mm wide and 4 to 6 mm thick around the entirety of the front raised rim including over the paperclips. After curing under ambient conditions for 7 days, a 48.2 cm square of drywall was attached to the stud face with 12 drywall screws, compressing the foam band between the drywall and the stud.

The assembly was then stood upright and the plywood side of the cavity was covered from the outside with a 0.076 mm (3 mil) polyethylene film, attached to the plywood with construction tape. The assembly was then mounted in an air flow apparatus with the film facing outwards away from the vacuum, and the drywall side facing inwards towards the vacuum. The pressure inside the air flow apparatus was reduced to 25 Pa below atmospheric pressure, and air flow was measured to obtain baseline air flow rates. The polyethylene film prevents air from flowing through the gaps in the plywood and through the cavity, and so allows the air flow due to other leaks in the system to be measured and subtracted from subsequent measurements.

After the baseline testing, the polyethylene film was removed while the assembly remained mounted in the air flow apparatus, and airflow was measured again. Air flow due to system leakage was removed from the result to calculate air flow through the cavity.

As an unsealed control, another assembly was prepared with the paperclip spacers but no sealant before attaching drywall. As comparative non-foamed examples, the face of the stud frame was treated with a continuous bead of acrylic latex caulk (DAP Alex plus from DAP Products Inc., Baltimore, Md.), and a second specimen with Liquid Nails™ DWP-24 Drywall Adhesive (Akzo Nobel Paints Strongsville, Ohio) immediately before attaching the dry wall squares. As a comparative foam example, a bead of GS W&D was applied to the face of a stud frame, allowed to cure for 7 days, then the drywall was attached to complete the control assembly.

Unless otherwise indicated, all foams in Examples A, B, and C were applied in conditions 27° C./80% RH.

Materials: A comparative commercial vinyl acetate/ethylene aqueous emulsion copolymer foam was DAP Tex Plus™ foam sealant by DAP Products Inc. (Baltimore, Md.) an acrylic latex containing foam designed for air sealing gaps.

TABLE 1A

Comparative Latex Aerosol Foam

| Raw Material | Prefoam amout |
|---|---|
| RHOPLEX™, 1 EC-1791 (acrylic emulsion) | 81.95 |
| STANFAX™, 2 320 (ammonium stearate) | 3.28 |
| AQUACER™, 3 539 (wax emulsion) | 3.40 |
| STANFAX™, 2 1 (potassium oleate) | 1.58 |
| Sodium Xylene Sulfonate (40% solids) | 0.40 |
| ACRYSOL™, 1 DR-72 (rheology modifier) | 0.34 |
| ROCIMA™, 1 BT2S (biocide) | 0.08 |
| Water | 8.97 |
| Total | 100 |

1 The Dow Chemical Co., Midland, MI;
2 Para-Chem, Dalton, GA
3 BYK-Chemie GMBH, Wesel, Germany.

All materials in Table 1A, above, were combined in the indicated proportions in a 2L plastic pail and were blended with propeller driven by an overhear stirrer. A stir rate was adjusted to approximately 200-300 rpm, to maintain a shallow vortex on the liquid surface for 15 minutes. The comparative aqueous latex prefoam (624 g) was charged into a 975 cc aluminum bullet can, and the valve was crimped. A blend of 68 wt. % iso-butane/12 wt. % propane/20 wt. % dimethyl ether (DME) (26 g total) was charged through the valve, and the cans were shaken by hand 40 times. Can pressures were measured at 3.1 to 3.8 bar.

Comparative commercial 1K PU foam: Great Stuff™ Window and Door foam sealant ("GS W&D"), a low expansion pressurized polyurethane prepolymer foam (Dow, Midland, Mich.).

TABLE 1

Raw Materials Used

| COMPONENT | CAS # | Description |
|---|---|---|
| PAPI™, 1 580N | 9016-87-9 | PMDI, Polymethylene polyphenyl polyisocyanate f = 3, Mw = 375, IE = 136.5, NCO = 30.8 |
| PAPI™, 1 27 | 9016-87-9 | PMDI , f = 2.7, Mw = 340 , IE = 134, NCO = 31.4 |
| VORANOL™, 2 220-110N | 25322-69-4 | Polypropylene Glycol f = 2, Mw = 1010, OH# = 110 |
| VORANOL™, 2 8000 | 25322-69-4 | Polypropylene Glycol f = 2, Mw = 8000, OH# = 14 |
| VORALUX™, 2 HF 505 | 0056449-05-9 | Sorbitol, propylene oxide, ethylene oxide polymer f = 6, Mw = 12000, OH# = 28 |
| STEPANOL™, 3 PS3152 | 32472-85-8 | Diethylene Glycol-phthalic Anhydride Polymer f = 2, Mw = 350, OH# = 315 |
| Propylene Carbonate | 108-32-7 | propylene carbonate |
| TCPP | 13674-84-5 | trichlorpropyl phosphate - Fire retardant |
| DMDEE | 06425-39-4 | 2,2'-dimorpholinodiethylether - moisture cure catalyst |
| DABCO™, 4 DC198 | — | silicone glycol copolymer surfactant |
| BAYSILON™, 5 M100 | 0063148-62-9 | di-methyl siloxanes and silcone fluid (defoamer) |
| A60/DME 80/20 | 74-98-6/75-28-5/115-10-6 | blend of 28% propane/51% isobutane/20% Dimethyl ether (<1% n-butane contaminant) Blowing agent |
| A60/DME 65/35 | 74-98-6/75-28-5/115-10-6 | blend by weight of 22.8% propane/41.2% isobutane 20% Dimethyl ether (<1% n-butane contaminant) Blowing agent |
| A45/DME 80/20 | 74-98-6/75-28-5/115-10-6 | blend by weight of 11% propane/68% isobutane/20% Dimethyl ether (<1% n-butane contaminant) Blowing agent |

1 and 2 The Dow Chemical Co., Midland, MI;
3 Stepan Company, Elwood, IL;
4 Air Products, Inc., Allentown, PA;
5 Bayer GmbH (Leverkusen, DE).

TABLE 2

Polyol intermediate Blend Compositions For PU Foams A Through C

| Polyol blend<br>COMPONENT | A (=B)<br>wt. % | C<br>w % |
|---|---|---|
| VORANOL 220-110N | 46.47 | 36.47 |
| STEPANOL PS3152 | 3.23 | 3.23 |
| VORALUX HF 505 | xx | 10.00 |
| Propylene Carbonate | 7.00 | 7.00 |
| TCPP | 40.00 | 40.00 |
| DMDEE | 0.30 | 0.30 |
| DABCO DC198 | 3.00 | 3.00 |

TABLE 2

Formulations Of Prepolymer And Blowing Agent.

| COMPONENT, wt. % | A gun | A straw | B gun | B straw | C gun | C straw |
|---|---|---|---|---|---|---|
| PAPI 580N | 21.78 | 21.78 | 22.86 | 22.86 | 21.75 | 21.75 |
| Polyol blend A | 62.20 | 62.20 | 60.10 | 60.10 | | |
| Polyol blend C | | | | | 61.25 | 61.20 |
| BAYSILON M100 | | 0.05 | | 0.05 | | 0.05 |
| A60/DME 80/20 | 16.00 | 16.00 | | | | |
| A60/DME 65/35 | | | 17.00 | 17.00 | 17.00 | 17.00 |
| % Free NCO in total formulation (minus BA) | 4.51 | | 5.08 | | 5.06 | |
| % Free NCO based on weight of active polyol + polyisocyanate | 7.20 | | 8.00 | | 8.06 | |

To test the foam cure in high humidity, a weather resistive barrier (WRB) aqueous coating was prepared as in U.S. Pat. No. 8,151,538, Example 16.

Inventive and comparative foams were evaluated for fresh foam density and foam cure speed by the methods disclosed above. The first coating time was less than an hour, and damage assessment along with fresh foam density are listed in Table 4, below.

TABLE 4

Setting of 6 mm Thick PU Foams vs. Comparative Foams, In 27° C./80% RH

| Example | g/cc | Hold time | Foam height at time of coating, and coating result |
|---|---|---|---|
| *GS Window and Door ™ Sealant[1] | 0.079 | 46 min | Foam expanded to >12 mm, not damaged |
| *Latex aerosol | 0.128 | 44 | Foam 8-10 mm, disrupted by sprayer |
| A straw | 0.108 | 41 | Foam ~3 mm, not damaged by spray |
| B straw | 0.087 | 39 | Foam ~3 mm, not damaged by spray |
| C straw | 0.095 | 36 | Foam ~3 mm, not damaged by spray |
| A gun | 0.047 | 31 | Foam 1-2 mm, not damaged by spray |
| B gun | 0.054 | 26 | Foam 1-2 mm, not damaged by spray |
| C gun | 0.042 | 21 | Foam 1-2 mm, not damaged by spray |

*Denotes Comparative Example;
[1]Dow Chemical, Midland, MI.

Comparative GREAT STUFF Window and Door (GS W&D) foam accepted a coating without damage, but left a bump thicker than the original 6 mm application. The comparative latex aerosol foam was damaged by the force of the sprayer. Inventive foams A, B, C, dispensed either through a straw or gun, accepted coatings without damage and left a bump thinner than the height of the foam in its original application.

A similar experiment was run on the lab bench at 20° C.(68° F.)/28% humidity. In this case, WRB coatings could be applied to all the inventive one component polyurethane foams by sprayer or brush in <1 hour without any damage to the foam. Even though one component polyurethane foams cure more slowly at low humidity, the inventive foams still cured enough in <1 h to accept a top coating.

After fully curing for 7 days, the 50 mm wide and 12 mm thick foam bands which had been applied on plywood were subject to the compressibility of foam test method from above. Because the bands were not exactly 50 mm wide, their actual width, and the test results are recorded in Table 5, below.

As shown in Table 5, below, all of the inventive one component polyurethane foams shrank by at least 25% of their original height under compression, even more so when applied with a gun. The Comparative foams either did not compress or cured very slowly, as shown in Table 4, above.

While as shown in Table 5, below, the tested one component polyurethane foams A, B and C all shrunk and could be compressed from their original dispensed height, other variations of collapsing or easily compressed foam were made, including those in which there was no polyol of functionality above 2.0; the polyol had a higher MW; the polyisocyanate (p-MDI) had a slightly lower average functionality, 3.0 reduced to 2.7; a defoamer was omitted from the straw foam, to check that effect; propylene carbonate was omitted from all; and there were 2 different blowing agent mixtures.

TABLE 5

Compressed Height (mm) of Foam Bands Under Increasing Weight. Fresh Foam Was Approx. 12 mm Thick

| | | Applied weight | | |
|---|---|---|---|---|
| | | 25 g | 225 g | 2.2 kg |
| Foam | Band width, mm | Foam band height, mm | | |
| A straw | 60 | 9 | 8 | 5 |
| B straw | 65 | 9 | 8 | 6 |
| C straw | 60 | 8.5 | 7.5 | 5.5 |
| A gun | 50 | 6.5 | 5.5 | 3 |
| B gun | 60 | 6.5 | 5.5 | 3 |
| C gun | 70 | 5 | 4 | 2.5 |
| *Latex | 60 | 1.5 | 1 | 0.5 |
| *GS W & D | 70 | 22 | 21 | 16 |

*Denotes Comparative Example

Some polyol intermediate variants are shown in Table 6, below; and the one component polyurethane foam compositions from them are shown in Table 7, below.

TABLE 6

Polyol Blend Intermediates for Foams D and E

| Polyol Intermediate<br>COMPONENT | D<br>% | E<br>% |
|---|---|---|
| VORANOL 220-110N | 56.70 | 10.00 |
| VORANOL 8000 | 0.00 | 46.70 |
| TCPP | 40.00 | 40.00 |
| DMDEE | 0.30 | 0.30 |
| DABCO DC198 | 3.00 | 3.00 |
| Total | 100.00 | 100.00 |

TABLE 7

Foam Recipes
(Each filled into both straw and gun cans,
labeled "F-straw" and "F-gun" etc.).

| COMPONENT, wt. % | F-foam | G-foam | H-foam | I-foam |
|---|---|---|---|---|
| PAPI 27 | 23.13 | 23.13 | 19.38 | 19.38 |
| polyol int D | 60.87 | 60.87 | | |
| polyol int E | | | 64.62 | 64.62 |
| A60/DME 80/20 | 16.00 | | 16.00 | |
| A45/DME 80/20 | | 16.00 | | 16.00 |
| Total | 100.00 | 100.00 | 100.00 | 100.00 |
| Straw can: | F-straw | G-straw | H-straw | I-straw |
| Gun can: | F-gun | G-gun | H-gun | I-gun |

TABLE 8

Calculated Composition of Each Recipe In Cans

| Example COMPONENT | F-foam Target % | G-foam Target % | H-foam Target % | I-foam Target % |
|---|---|---|---|---|
| PAPI 27 | 23.13 | 23.13 | 19.38 | 19.38 |
| Voranol 220-110N (1010 L) | 34.51 | 34.51 | 6.46 | 6.46 |
| Voranol 8000 | | | 30.18 | 30.18 |
| PCF/TCCP | 24.35 | 24.35 | 25.85 | 25.85 |
| DMDEE | 0.18 | 0.18 | 0.19 | 0.19 |
| DABCO DC 198 | 1.83 | 1.83 | 1.94 | 1.94 |
| Propane | 4.48 | 1.76 | 4.48 | 1.76 |
| Isobutane | 8.16 | 10.88 | 8.16 | 10.88 |
| N-butane | 0.16 | 0.16 | 0.16 | 0.16 |
| DME | 3.20 | 3.20 | 3.20 | 3.20 |
| TOTAL % | 100.00 | 100.00 | 100.00 | 100.00 |
| Calculated % NCO: | | | | |
| in prepolymer: | 5.15 | | 5.88 | |
| based on weight of total polyol + polyisocyanate: | 7.51 | | 8.81 | |

Inventive foams F through I, dispensed both from gun cans and straw cans, were tested by the "Foam Cure Speed", as described above. The test was modified to set the environmental room at 10° C./80% humidity. Curing at lower temperature is known to slow the cure reaction. As shown in Table 9 below, in the environmental room even at 10° C./80% humidity, the inventive PU foam cured in <1 hour and was not damaged by the spray of coating. GREAT STUFF W&D foam accepted coating without damage, but left a bump thicker than the original 6 mm application. The comparative latex aerosol foam from table 1A, above, and the commercially available DAPTex™ foam, were both damaged by the force of the sprayer even if allowed to cure up to 4 hours in the environmental room. Inventive foams F, G, H and I, and repeat tests of foams B and C, accepted coating without damage and left a bump thinner than the originally applied foam with gun or straw foam, and with either blowing agent blend.

TABLE 9

Foam Density And Overspraying Summary at 1 hour,
at 10° C./80% Relative Humidity

| Example | Density g/cc | Result of spraying WRB coating at 1 hour |
|---|---|---|
| F-gun | 0.034 | OK. Foam was grainy, 0.1-1 mm cells. |
| G-gun | 0.033 | Tops of cells had clear foam, coating covered |
| H-gun | 0.024 | OK. Bead shrank most of all, and |
| I-gun | 0.025 | band had self-flattened to <3 mm. Smoothest transition at coated |
| F-straw | 0.064 | OK. Denser and tougher |
| G-straw | 0.062 | |
| G-straw | 0.065 | OK. Denser. Individual bead lines |
| I-straw | 0.065 | in band flowed together. On board, large 5-10 mm bubbles. |
| *Latex Table 1A-gun | 0.11 | Overcoat also failed at 4 hours, foam damaged |
| *DAP commercial- | 0.11 | Overcoat also failed at 4 hours, foam damaged |
| *GS W&D-gun | 0.039 | OK. |
| B-gun | 0.047 | OK. |
| C-gun | 0.030 | OK. |

*Denotes Comparative Example.

The "Foam Cure Speed" test, described above, was also repeated on an open lab bench measured at 20° C./28% humidity. Moisture cured one component polyurethane foam is known to cure more slowly in a low humidity atmosphere. In this case, the inventive foam B-gun was tested, and after 2 hours of cure, an WRB aqueous coating was applied by brush. The force of brushing is potentially more damaging to uncured foam. Nonetheless, this coating application did not disrupt nor visibly damage the inventive foams.

WRB Function: Specimens for the "WRB Function" test, described above, were prepared. To one specimen, inventive foam B-gun was applied over the OSB gap at 20° C./28% humidity. After 1 hour cure, WRB aqueous coating was applied as in the "foam cure speed" test. To a second specimen in the environmental room at 10° C./80% humidity, foam H-gun was applied over the OSB gap. After 1 h cure, a WRB aqueous coating was applied as in the "foam cure speed" test. After drying for 7 days on the bench and attaching the test cylinders, both specimens were filled to 550 mm with water. No leaks were detected for 24 h, when the test was stopped.

Selected foams were subjected to the Degree and Rate of Foam Shrinkage Upon Cure test method, described above. The actual temperature and % relative humidity during cure are reported in Table 10, below, along with test results. Inventive foams H-gun and C-gun each collapsed by over 50% within 45 min, and H-gun even faster. By comparison, commercially available GS W&D, and also GREAT STUFF PRO™ Wall and Floor adhesive ("GS-Wall") underwent an initial small contraction, then slight expansion over time. The comparative foams do not self collapse, whereas the inventive foams do and thereby enable installation and application coating of materials over them, leaving a much smaller bump.

TABLE 10

Cure Shrinkage, Height Of 1K PU Foams On Plywood

| | Foam | | | | |
|---|---|---|---|---|---|
| | H-gun | H-gun | C-gun Cure | *GSW&D | *GS-Wall |
| Time min | 25° C./ 26% | 24° C./ 45% | 24° C./ 45% | 24° C./ 45% | 24° C./ 69% |
| | Foam height in mm | | | | |
| 0.25 | 14.5 | 14 | | 13.5 | |
| 0.5 | 14 | 13.5 | | 13 | 16 |
| 1 | 12 | 12 | 18 | 13 | 16 |
| 1.5 | 11 | 10.5 | 17 | 13 | |
| 2 | 9.5 | 9 | 17 | 12.5 | 15 |
| 2.5 | 8.5 | 8 | 16 | 12.5 | |
| 3 | 7.5 | 7 | 15.5 | 12.5 | 15 |
| 4 | 6 | 5.5 | 15 | 12.5 | |
| 5 | 5 | 5 | 14 | 12.5 | 14.5 |
| 7.5 | 3.5 | 3.5 | 13 | 13 | 14 |
| 10 | 3 | 2.5 | 12.5 | 13.5 | 14 |
| 15 | 2.5 | 2.5 | 12 | 14 | 14.5 |
| 20 | 2.5 | 2 | 11 | 14 | 15 |
| 30 | 2.5 | 2 | 10 | 14 | 15.5 |
| 45 | | | 9 | | 16 |
| 60 | | | 8 | | 16.5 |
| 120 | | | 6 | | 17 |

*Denotes Comparative Example

Selected foams had been cured in a cooler and more humid environmental room at 10° C./80% for 4 hours, then on the lab bench for 7 days. These were subject to the Foam Compressibility test method. Results are reported in Table 11, below.

TABLE 11

Foam Compressibility of 12 mm Initial Thickness

| Example | Band, cm | 25 g | 225 g | 2.2 kg |
|---|---|---|---|---|
| | | Foam band height, mm | | |
| *GSW&D | 5.5 | 17.3 | 17.3 | 14.9 |
| G-straw | 6.0 | 6.5 | 6.0 | 4.0 |
| I-straw | 8.0 | 9.0 | 8.5 | 8.0 |
| B-gun | 5.5 | 6.0 | 5.0 | 3.0 |
| C-gun | 5.0 | 6.5 | 5.5 | 3.5 |
| F-gun | 6.0 | 5.5 | 5.0 | 3.0 |
| G-gun | 5.5 | 6.5 | 5.5 | 3.5 |
| H-gun | 5.5 | 4.0 | 3.5 | 2.5 |
| I-gun | 5.5 | 3.0 | 2.5 | 2.0 |

*Denotes Comparative Example

As shown in Table 11, above, all of the inventive one component polyurethane foams compress under a small load; however, the Comparative foam does not.

Air leakage results from the foamed in place gasket test are summarized in Table 12, below. Acrylic caulk or drywall adhesive both block>98% of air leaks, but require the drywall to be installed before these materials have started to cure, usually within 2 hours. Cured GREAT STUFF™ W&D foam sealant is not readily compressible and the drywall could not be attached closely to the stud, leaving some air leaks. Both inventive foams C-gun and H-gun cured to a readily compressible gasket and both blocked >99% of air leakage between the drywall and stud.

TABLE 12

Air sealing of drywall to studs by various gaskets.

| Stud face sealant | Air leakage |
|---|---|
| No sealant, just spacers | 100% |
| *Acrylic caulk, dry wall applied while wet | <0.2% |
| *Drywall adhesive, drywall applied while wet | 1.9% |
| *GS Window and Door | 32% |
| Inventive foam C-gun | 0.7% |
| Inventive foam H-gun | <0.2% |

*Denotes Comparative Example

We claim:

1. A method for making a flexible, weather-resistive barrier for use in the construction of a building having a structural frame with adjacent sheets of wood, cement or gypsum exterior sheathing on the structural frame, the adjacent sheets having a gap formed between them, the method comprising:
    applying a self-collapsing, one component polyurethane foam composition to the gap formed between adjacent sheets of sheathing, including the margin of the sheathing adjacent the gap to hold the foam composition;
    applying an aqueous polymeric coating having a density when dried of greater than 0.7 g/ml over the sheathing, wherein the one component polyurethane foam composition comprises:
    a) one or more blowing agents;
    b) one or more isocyanate prepolymers from the reaction of one or more polyisocyanate and one or more polyol in the presence of a catalyst, wherein the isocyanate prepolymers have free isocyanate groups in the amount of from 2 to 10 wt. %, based on total isocyanate prepolymer weight; and
    c) 0.1 wt % or less of a cell opener based on polyol weight;
    and wherein the self-collapsing, one component polyurethane foam composition collapses in a controlled way to a thickness less than the thickness of the originally applied foam.

2. The method as claimed in claim 1, wherein the aqueous polymeric coating is an acrylic emulsion polymer coating.

3. The method as claimed in claim 1, wherein the catalyst in the one component polyurethane foam composition is an amine catalyst.

4. The method as claimed in claim 1, wherein the one component polyurethane foam composition further comprises one or more surfactant chosen from a silicon containing surfactant and a nonionic surfactant.

5. The method as claimed in claim 1, wherein the one component polyurethane foam composition further comprises one or more diluent, flame retardant or plasticizer.

6. The method as claimed in claim 1, wherein in the one component polyurethane foam composition, the polyurethane prepolymer has a free isocyanate group content of from 4 to 9 wt. %, based on total isocyanate prepolymer weight.

7. The method as claimed in claim 1, wherein the one component polyurethane foam composition further comprises a cell opener to ease the collapse of the foam during curing.

8. A method for making a flexible, foamed in place gasket for use in the construction of a building having a wood, aluminum or composite structural element comprising:

applying a foamed composition of one or more self-collapsing, one component polyurethane to the structural element as a substrate;

drying the applied foamed composition to form a dry foam layer having a thickness less than the original thickness of the applied foam;

installing an additional element chosen from a structural element or drywall adjacent the dry foam layer on the structural element;

wherein the one component polyurethane foam composition contains:

a) one or more blowing agents;

b) one or more isocyanate prepolymers from the reaction of one or more polyisocyanate and one or more polyol in the presence of a catalyst, wherein the isocyanate prepolymers have free isocyanate groups in the amount of from 2 to 10 wt. %, based on total isocyanate prepolymer weight; and c) 0.1 wt % or less of a cell opener based on polyol weight.

9. The method as claimed in claim 8, wherein the structural element is a subfloor and the additional element is a tilt up wall.

10. The method as claimed in claim 9, wherein the structural element is chosen from studs, sill plates, top plates, joists and the additional element is drywall.

* * * * *